W. R. CLARK & W. M. G. CAMPBELL.
MILK AND CREAM CAN.
APPLICATION FILED MAR. 15, 1909.
946,654.
Patented Jan. 18, 1910.
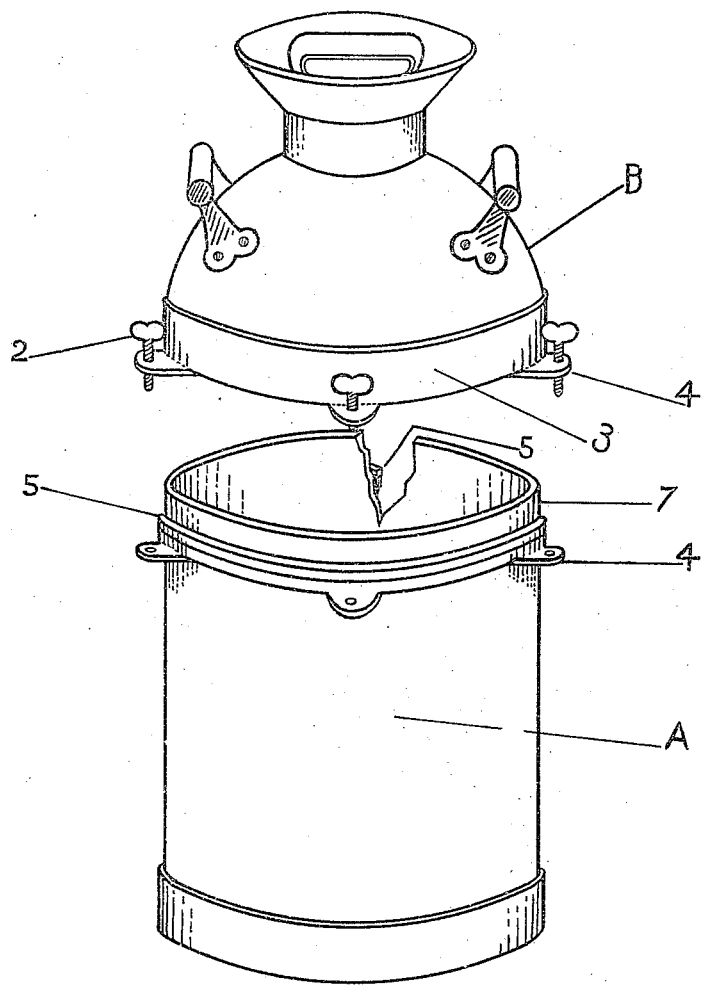
Witnesses,
Inventors,
W. R. Clark
W. M. G. Campbell.

UNITED STATES PATENT OFFICE.

WILLIAM R. CLARK AND WILLIAM M. G. CAMPBELL, OF LINCOLN, NEBRASKA.

MILK AND CREAM CAN.

946,654.  Specification of Letters Patent.  Patented Jan. 18, 1910.

Application filed March 15, 1909. Serial No. 483,665.

*To all whom it may concern:*

Be it known that we, WILLIAM RICE CLARK and WILLIAM MUSSEN G. CAMPBELL, citizens of the United States, residing at Lincoln, in the county of Lancaster and State of Nebraska, have invented new and useful Improvements in Milk and Cream Cans, of which the following, taken in connection with the accompanying drawings, is a full, clear, and exact description.

Our invention relates to improvements in milk and cream cans in which we apply a new and novel joint connecting the two parts of the can.

The objects of our improvements are: First; to provide a can the interior of which can be easily and thoroughly cleaned, sunned and aired: Second; affording facilities for quick and cheap repair whenever soldering has to be done from inside of the can. We obtain these objects by the mechanism illustrated in accompanying drawing.

A is body or lower portion of can, cylindrical in form, constructed preferably of tin; provided with a metal band around its upper edge #7, this band having a smooth, cut-in shoulder to retain gasket #5; also threaded extensions #4 for engaging thumb-screws #2 when parts A and B are assembled.

B is top portion of can having a band #3 around lower edge with threaded extensions #4 to conform with lower portion A when the two parts A and B are adjusted, the same being held together by thumb-screws #2 making a perfectly tight joint.

What we claim as our invention and desire to secure by Letters Patent is:—

A milk or cream can comprising a body portion A having a clamping band provided with extensions with threaded openings secured to the open end thereof, a removable breast having a clamping band provided with extensions and adapted to be secured to the body portion A by thumb screws, and a packing interposed between the bands substantially as described.

W. R. CLARK.
W. M. G. CAMPBELL.

Witnesses:
G. L. DE LACY,
C. W. ERVIN.